(12) United States Patent
Choate et al.

(10) Patent No.: US 11,125,343 B2
(45) Date of Patent: Sep. 21, 2021

(54) SYSTEMS AND METHODS FOR SIDE ENTRY BALL VALVE BODY QUICK CONNECTIONS

(71) Applicant: Vault Pressure Control LLC, Houston, TX (US)

(72) Inventors: Jeremy Choate, Houston, TX (US); Keith M. Adams, Katy, TX (US); Mahesh Udipi, Houston, TX (US)

(73) Assignee: Vault Pressure Control LLC, Houston, TX (US)

( * ) Notice: Subject to any disclaimer, the term of this patent is extended or adjusted under 35 U.S.C. 154(b) by 9 days.

(21) Appl. No.: 16/694,425

(22) Filed: Nov. 25, 2019

(65) Prior Publication Data

US 2021/0156485 A1   May 27, 2021

(51) Int. Cl.
*F16K 5/06* (2006.01)
*F16K 27/06* (2006.01)

(52) U.S. Cl.
CPC .......... *F16K 5/0642* (2013.01); *F16K 27/067* (2013.01)

(58) Field of Classification Search
CPC .... F16K 5/0626; F16K 5/0642; F16K 27/067; F16L 29/002; F16L 37/252; F16L 37/47
See application file for complete search history.

(56) References Cited

U.S. PATENT DOCUMENTS

| | | | | |
|---|---|---|---|---|
| 514,055 A * | 2/1894 | Barnard | ................ | F16L 37/252 285/88 |
| 2,868,498 A * | 1/1959 | Kaiser | .................. | F16K 5/0626 251/172 |
| 4,438,779 A * | 3/1984 | Allread | ................. | F16L 37/113 137/614.06 |
| 6,092,844 A * | 7/2000 | Lee | ........................ | F16L 37/252 285/90 |
| 6,409,221 B1 * | 6/2002 | Robinson | ................ | F16L 37/24 285/360 |
| 8,887,762 B2 * | 11/2014 | Densel | .................... | F16L 37/36 137/614.06 |
| 9,212,758 B2 | 12/2015 | Adams | | |
| 2012/0299291 A1 * | 11/2012 | Kamiya | ................. | F16L 37/36 285/308 |

FOREIGN PATENT DOCUMENTS

GB            809085 A  *  2/1959  ............ F16L 37/252

* cited by examiner

*Primary Examiner* — Hailey K. Do
(74) *Attorney, Agent, or Firm* — Morgan, Lewis & Bockius LLP (57) ABSTRACT

A valve for regulating a fluid flow includes a body portion, a tail portion, and a coupling mechanism joining the body portion to the tail portion. The coupling mechanism includes a plurality of body portion lugs, each body portion lug being separated from an adjacent body portion lug by a body portion opening. The coupling mechanism also includes a plurality of tail portion lugs, each tail portion lug being separated from an adjacent tail portion lug by a tail portion opening. In operation, each body portion lug is adapted to axially move through a corresponding tail portion opening to transition an axial position of the tail portion relative to the body portion, at least one of the tail portion or the body portion being rotatable axially a body portion lug with a tail portion lug to block axial movement of the tail portion relative to the body portion.

20 Claims, 7 Drawing Sheets

SYSTEMS AND METHODS FOR SIDE ENTRY BALL VALVE BODY QUICK CONNECTIONS

BACKGROUND

1. Field of Invention

This disclosure relates in general to oil and gas tools, and in particular, to systems and methods of forming a side entry ball valve using quick connection features between components.

2. Description of the Prior Art

A variety of industrial applications may incorporate flow control devices, such as valves, to regulate pressure and flow in different scenarios. For example, oil and gas production may incorporate valves to regulate flow from a wellbore while refining or processing applications may incorporate valves to regulate process flows. In various embodiments, different types of valves may be used, such as ball valves. Ball valves may be utilized for a variety of reasons, such as providing full port flow, quick opening and closing, and advantageous properties for corrosive service. However, typical ball valves are formed by joining a body end to a tail end via fasteners, such as bolts, which may be exposed to a corrosive environment. Techniques for protecting against corrosion may be expensive. Furthermore, in embodiments, the fasteners may back off after extended use, which may lead to leaks. Additionally, making multiple bolted connections for assembly is time consuming.

SUMMARY

Applicant recognized the problems noted above herein and conceived and developed embodiments of systems and methods, according to the present disclosure, for side entry ball valve connections.

In an embodiment, a valve for regulating a fluid flow includes a body portion forming at least a portion of a chamber, a tail portion forming at least a portion of the chamber, and a coupling mechanism joining the body portion to the tail portion. The coupling mechanism includes a plurality of body portion lugs, formed in the body portion, extending radially inward toward a flow passage axis, each body portion lug of the plurality of body portion lugs being separated from an adjacent body portion lug by a body portion opening. The coupling mechanism also includes a plurality of tail portion lugs, formed in the tail portion, extending radially outward from the flow passage axis, each tail portion lug of the plurality of tail portion lugs being separated from an adjacent tail portion lug by a tail portion opening. In embodiments, each body portion lug is adapted to axially move through a corresponding tail portion opening to transition an axial position of the tail portion relative to the body portion, at least one of the tail portion or the body portion being rotatable relative to the other tail portion or the body portion to axially align at least one body portion lug with at least one tail portion lug to block axial movement of the tail portion relative to the body portion.

In an embodiment, a valve for regulating a fluid flow includes a body portion forming at least a portion of a chamber. The body portion includes a plurality of body portion lugs, each body portion lug of the plurality of body portion lugs being separated from an adjacent body portion lug by a body portion opening. The body portion also includes a body portion groove, the body portion groove arranged proximate the plurality of body portion lugs. The valve further includes a tail portion forming at least a portion of the chamber. The tail portion includes a plurality of tail portion lugs, each tail portion lug of the plurality of tail portion lugs being separated from an adjacent tail portion lug by a tail portion opening. The tail portion also includes a tail portion groove, the tail portion groove arranged proximate the plurality of tail portion lugs. The valve also includes a ball body positioned within the chamber, the ball body being rotatable about a longitudinal axis to enable and block flow through a flow passage arranged along a flow passage axis, the flow passage axis being substantially perpendicular to the longitudinal axis. In embodiments, the tail portion is adapted to move axially relative to the body portion, along the flow passage axis, to transition the plurality of tail portion lugs from a first side of the body portion lugs to a second side of the body portion lugs, the at least one of the tail portion or the body portion being rotatable relative to the other tail portion or the body portion to axially align at least one body portion lug with at least one tail portion lug to block axial movement of the tail portion relative to the body portion.

In an embodiment, a method for forming a valve body closure includes positioning a body portion proximate a tail portion, the body portion and the tail portion being axially aligned. The method also includes moving at least one of the body portion or the tail portion axially toward the other of at least one of the body portion or the tail portion such that at least part of the body portion overlaps at least part of the tail portion. The method further includes rotating at least one of the body portion or the tail portion with respect to the other at least one of the body portion or the tail portion.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed toward a coupling mechanism used to form a valve body closure by reducing or eliminating external fasteners. In various embodiments, components of the valve body closure may include lugs and openings that enable opposing lugs to pass through and facilitate coupling of the components while restricting movement along a flow axis. In certain embodiments, the valve body closure includes a body portion and at least one tail portion. The body portion may include body portion lugs that are arranged circumferentially about a circumference while the at least one tail portion includes tail portion lugs that are also arranged circumferentially about a circumference. Openings or gaps between the respective lugs may facilitate axial movement between the components when the lugs and openings are aligned. Upon rotation of at least one of the body portion or the tail portion, the lugs may become aligned, which restricts the axial movement. As a result, a valve body closure may be formed without utilizing external fasteners. Furthermore, the connection may be pressure containing such that a flow through the valves may pass through the connection between the body portion and the at least one tail portion.

Figure 1:
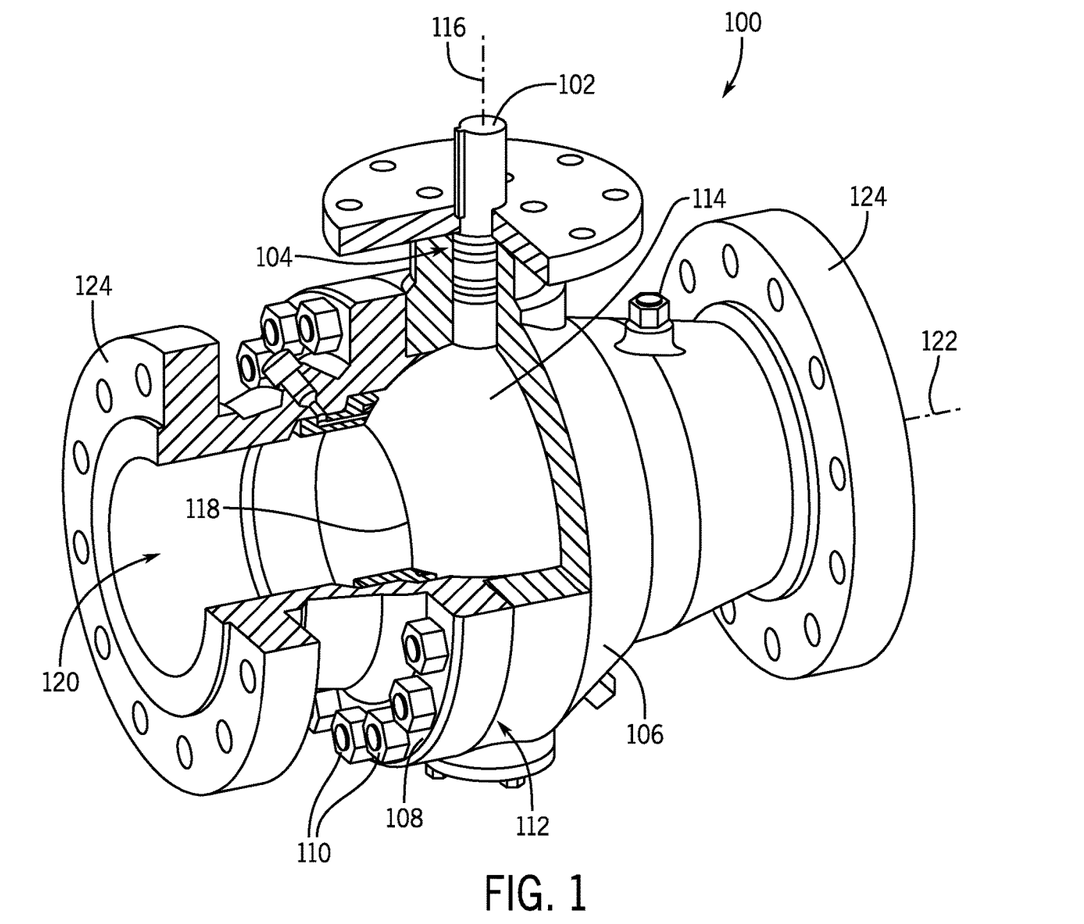
FIG. 1 is partial perspective view of an embodiment of a valve, in accordance with embodiments of the present disclosure.

FIG. 1 is a partial sectional view of an embodiment of a valve 100, which is a ball valve in the illustrated embodiment. The ball valve 100 includes a stem 102 extending through a bore 104 formed in a body 106 (e.g., body end, body portion). The body 106 is coupled to a tail 108 (e.g, tail end, tail portion) via a plurality of fasteners 110, which are illustrated as bolts in FIG. 1. In various embodiments, these fasteners 110 may be subject to corrosion, due to environmental factors, the fluid flowing through the valve 100, etc. While corrosion inhibiting coatings may be utilized, these are often expensive and have a certain lifespan. Corrosion or other difficulties with the fasteners may lead to a reduced holding capability, which could cause leaks at an interface 112 between the body 106 and the tail 108. Additionally, initial assembly operations may be time consuming due to making the various bolted connections. Furthermore, maintenance operations may also be time consuming due to the bolted connections.

The valve 100 further includes a ball body 114 coupled to the stem 102. The ball body 114 rotates about a longitudinal axis 116 in response to rotation of the stem 102. In embodiments, the valve 100 may be a quarter turn valve, which enables fast opening and closing of the valve 100. The ball body 114 includes an opening 118 that is aligned with a flow passage 120 having a flow axis 122. The illustrated ball body 114 is in an open position such that the opening 118 is aligned with the flow passage 120 extending through the body 106 and the tail 108. In the closed position, which is not illustrated, the opening 118 may be arranged substantially 90 degrees from the current position such that flow through the flow path 118 is blocked. It should be appreciated that while the illustrated valve 100 includes coupling ends 124 having flanges, that in other embodiments, the coupling ends 124 may be threaded, prepped for welding, or a combination thereof.

Embodiments of the present disclosure are directed toward a coupling mechanism that includes a plurality of lugs arranged along a tail portion that may interact with a plurality of lugs arranged along a body portion to form a valve body closure, such as for a ball valve, without utilizing the plurality of fasteners illustrated in FIG. 1. In various embodiments, the coupling mechanism may enable rapid coupling and decoupling of the tail from the body to facilitate repairs and the like. Furthermore, in embodiments, the valve may be formed in a two-piece configuration, a three-piece configuration, a four-piece configuration, or the like based on various desired operational conditions. Advantageously, utilizing multiple components and the coupling mechanism enables faster assembly of the valves, fewer parts, and a more robust connection.

Figure 2:
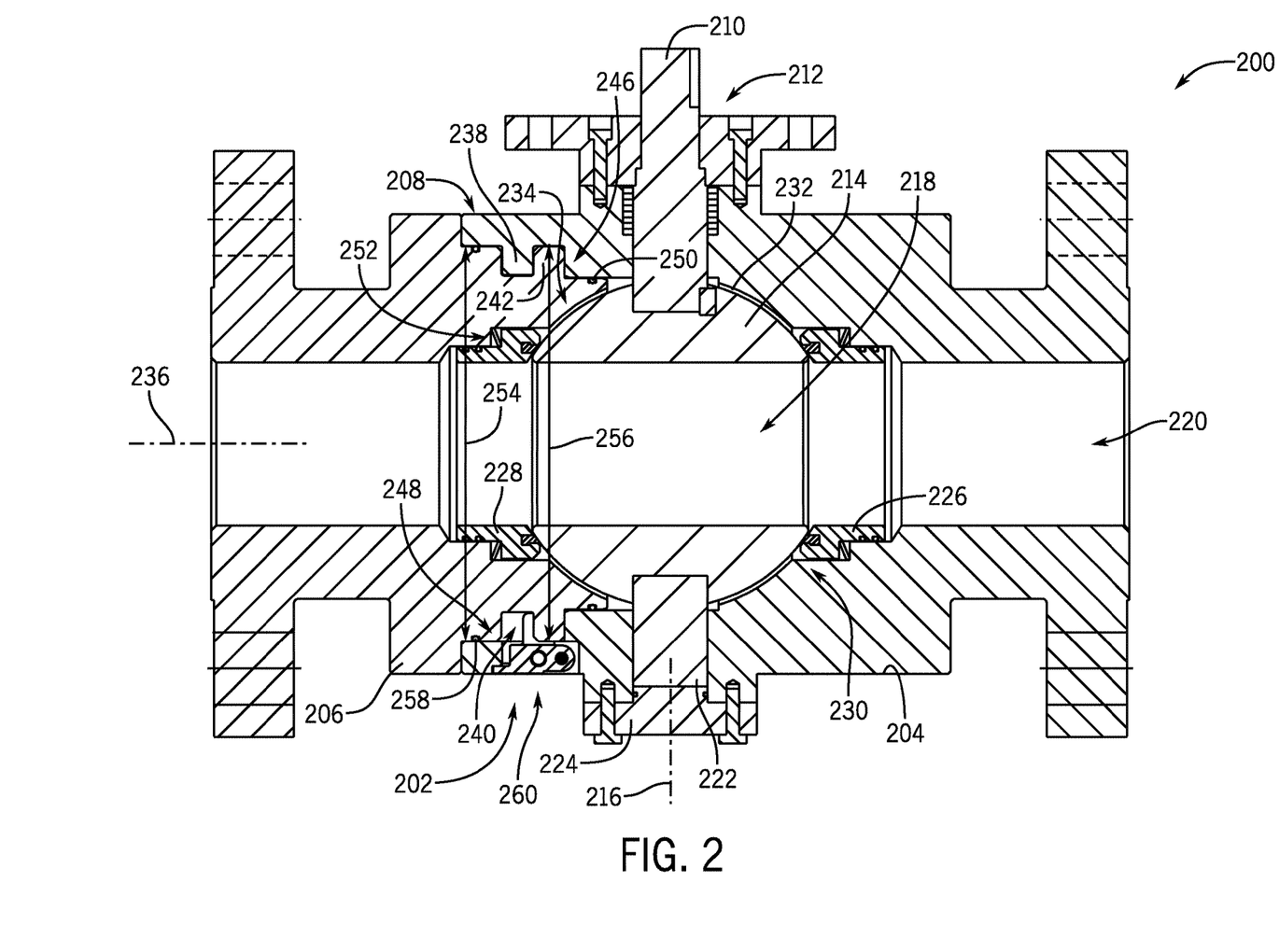
FIG. 2 is a cross-sectional view of an embodiment of a two-part valve, in accordance with embodiments of the present disclosure.

FIG. 2 is a cross-sectional view of an embodiment of a valve 200 formed utilizing systems and methods of the present disclosure including a coupling mechanism 202. As shown, the valve includes a body portion 204 and a tail portion 206. The body portion 204 and tail portion 206 are coupled together at an interface 208 via the coupling mechanism 202 to form a valve body closure. Advantageously, the coupling mechanism 202 does not utilize the fasteners 110 of FIG. 1 to join the body portion 204 and the tail portion 206, thereby reducing potential exposure of those components to corrosive environments and reducing assembly times for the valve 200. However, even without the use of fasteners, flow is permitted through the closure so that the valve continues to function in a predictable manner, which would reduce confusion for operators and low barriers to entry.

The illustrated valve 200 may be described as a trunnion ball valve that includes an upper valve stem 210 extending through a bore 212 formed in the body portion 204. The valve stem 210 couples to a ball body 214, which may be rotated about a longitudinal axis 216 to enable or block flow through an opening 218 that aligns with a flow passage 220 of the valve 200. Furthermore, the valve 200 includes a lower valve stem 222 coupled to the ball body 214. The lower valve stem 222 is secured to the body portion 204 via a plate 224. It should be appreciated that while a trunnion ball valve is illustrated, that embodiments of the present disclosure may also be used with a floating ball valve. The illustrated embodiment also includes several moving components of the valve positioned within the body portion 204. This configuration may be advantageous with regard to assembly and also coupling of the tail portion 206. For example, installation of the tail portion 206 of the current embodiment incorporates the tail valve seat 228 and no additional moving components, thereby simplifying installation. However, it should be appreciated that, in other embodiments, various components may be incorporated into the tail portion 206. For example, a portion of the bore 212 may be formed by a portion of the tail portion 206, among other configurations.

In operation, the ball body 214 rotates about the longitudinal axis 216 in response to rotation of the valve stem 210. The ball body 214 may seal against a body valve seat 226 and a tail valve seat 228. In the illustrated embodiment, the valve seats 226, 228 are spring loaded, to facilitate contact between the ball body 214 and the seats 226, 228, but it should be appreciated that the valve seats 226, 228 may be fixed. As a result, replacing the seat may lead to replacements of the body portion 204 or the tail portion 206, which may be undesirable in certain embodiments. Furthermore, in embodiments, the valve seats 226, 228 may be removable. Accordingly, valve seats may be replaced without replacing larger components of the valve. In operation, the valve seats may experience more wear than the body and/or tail portions due to their contact with the ball and also exposure to particulates and the like. As a result, wear on the valve seats may impact operations long before evidence of wear on the body and/or tail portions. Enabling replacement of the valve seats may extend the overall life of the valve and also reduce costs for operators. Additionally, in various embodiments, the valve 200 may be a unidirectional valve, and as a result, only a single valve seat may be arranged along the flow passage 220. The ball body 214 is arranged within a chamber 230, which includes a curved surface 232 that substantially conforms to a shape of the ball body 214. However, in various embodiments, it should be appreciated that a gap 234 may be positioned between at least a portion of the ball body 214 and the curved surface 232 to facilitate debris or other potential infiltrations, while still enabling operation of the valve. That is, direct contact may be limited to the seats to reduce wear.

The illustrated coupling mechanism 202 of the body portion 204 and the tail portion 206 facilitates coupling of the body portion 204 to the tail portion 206 while also restricting axial movement of the components, relative to one another, along a flow passage axis 236. For example, the body portion 204 includes a plurality of body portion lugs 238 that extend radially inward, toward the flow passage axis 236, and are positioned circumferentially about a circumference of the body portion 204. As will be described below, the body portion lugs 238 are separated by one another by body portion openings 240 such that the body portion lugs 238 are separated from adjacent body lugs 238. The separation enables interaction with tail portion lugs 242, which extend radially outward away from the flow passage axis 236. The tail portion lugs 242 are also separated from adjacent tail portion lugs 242 via tail portion openings 244 (not pictured). Accordingly, as the tail portion 206 engages the body portion 204, the body lugs 238 pass through the tail portion openings 244 as the tail portion lugs 242 pass through the body portion openings 240 to arrange the tail portion lugs 242 within a body portion groove 246 and the body portion lugs 238 within a tail portion groove 248. In operation, one or both of the body portion 204 and/or the tail portion 206 is rotated about the flow passage axis 236 to align the body portion lugs 238 with the tail portion lugs 242, thereby blocking axial movement of the tail portion 206 relative to the body portion 204.

In the illustrated embodiment, the tail portion 206 includes a tail portion seal 250 positioned axially closer to the stems 210, 222 than the tail portion lugs 242. In other words, the tail portion seal 250 is axially closer to the longitudinal axis 216. The tail portion seal 250 may block fluid from leaking from the chamber 230. In various embodiments, a tail portion chamber section 252 is particularly selected such that an outer diameter 254 is less than an inner diameter of a body portion chamber diameter 256, thereby facilitating formation of the valve 200. A secondary tail portion seal 258 is also arranged axially farther from the longitudinal axis 216 than the tail portion lugs 242. There may also be more or fewer seals. It should be appreciated that while the illustrated embodiment includes the tail portion 206 arranged within the body portion 204, in other embodiments the tail portion 206 may be outside of the body portion 204.

The system further includes a locking mechanism 260 that may include an extension that translates into at least one of the body portion groove 246 or the tail portion groove 248 to block rotation of the tail portion 206 relative to the body portion 204. For example, the locking mechanism 260 may include a hinged body component that translates toward and away from the respective groove 246, 268 to enable and block rotation.

Accordingly, systems and methods of the present disclosure facilitate formation of the valve 200 using the body portion 204 and the tail portion 206 having the coupling mechanism 202 to facilitate coupling without using external fasteners, such as bolts used in traditional ball valves. Moreover, various embodiments facilitate rapid coupling, for example, rotation of less than 360 degrees may be sufficient to align the body lugs 238 with the tail lugs 242. As a result, initial manufacturing and later maintenance operations may be easier and completed more quickly. Furthermore, as noted above, the body and tail portions 204, 206 may be formulated to work in various conditions by modifying the coupling ends, such as including flanges, threads, slip end, weld prepped ends, and the like.

Figure 3:
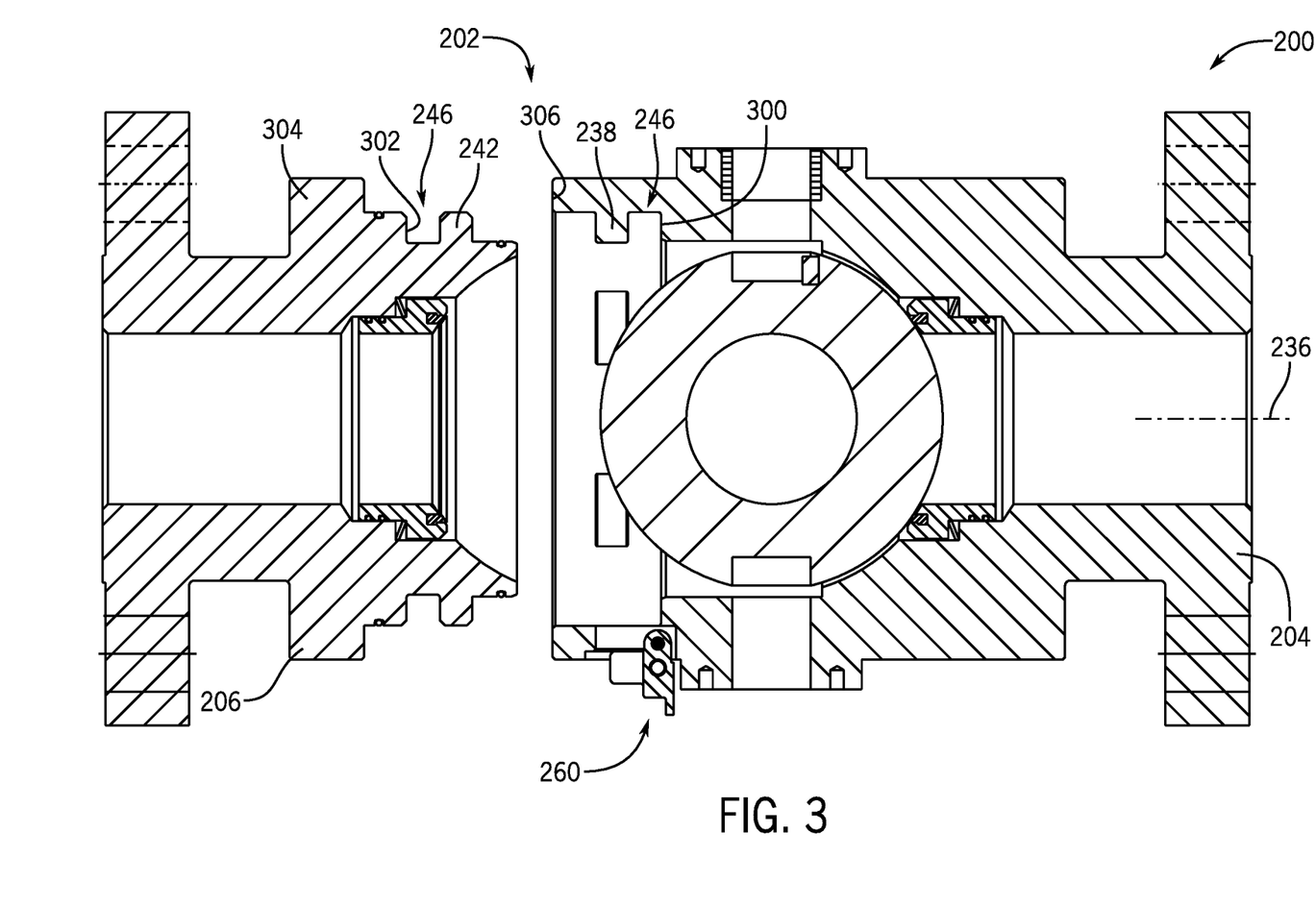
FIG. 3 is a cross-sectional view of an embodiment of a two-part valve, in accordance with embodiments of the present disclosure.

FIG. 3 is a cross-sectional view of an embodiment of the valve 200 in which the tail portion 206 is decoupled from the body portion 204. As described above, in the illustrated embodiment the coupling mechanism 202 includes components of both the body portion 204 and the tail portion 206. For example, the body portion 204 includes the body portion lugs 238 extending radially inward toward the flow passage axis 236. The body portion groove 246 is arranged proximate the body portion lugs 238 and is formed at least in part by the body portion lugs 238 and a shelf 300. In various embodiments, the tail lugs 242 are arranged within the body portion groove 246 and may contact the shelf 300. Further illustrated within the body portion 204 is the locking mechanism 260, which is illustrated in an unlocked position. In operation, after the tail portion 206 is coupled to the body portion 204, the locking mechanism 260 is translated to the locked position. It should be appreciated that the locking mechanism 260 may also or alternatively be on the tail portion 206.

Turning to the tail portion 204, the tail portion lugs 242 are illustrated proximate the tail portion groove 246, which is formed at least partially by the tail portion lugs 242 and a tail stop 302. As described, in various embodiments the tail portion 206 engages the body portion 204, for example by passing the tail portion lugs 242 through the body portion openings 240. In embodiments, an outer flange 304 of the tail portion 206 may engage a body portion shoulder 306 when the tail portion 206 engages the body portion 204. This may provide a visual indicator to the operator that installation was successful. Accordingly, a two-part valve body may be formed by utilizing the coupling mechanism 202. As noted above, the moving components are illustrated as being all positioned within the body portion 204, which may enable easier assembly and reduce the likelihood of errors when coupling the tail portion 206 to the body portion 204. Additionally, separation of the components enables access to the interior portions of the valve, thereby facilitating later maintenance or repair operations. Furthermore, in the illustrated embodiment, the coupling mechanism is illustrated as being within the flow path, and as a result, is particularly selected to provide sufficient pressure containing capabilities.

Figure 4:
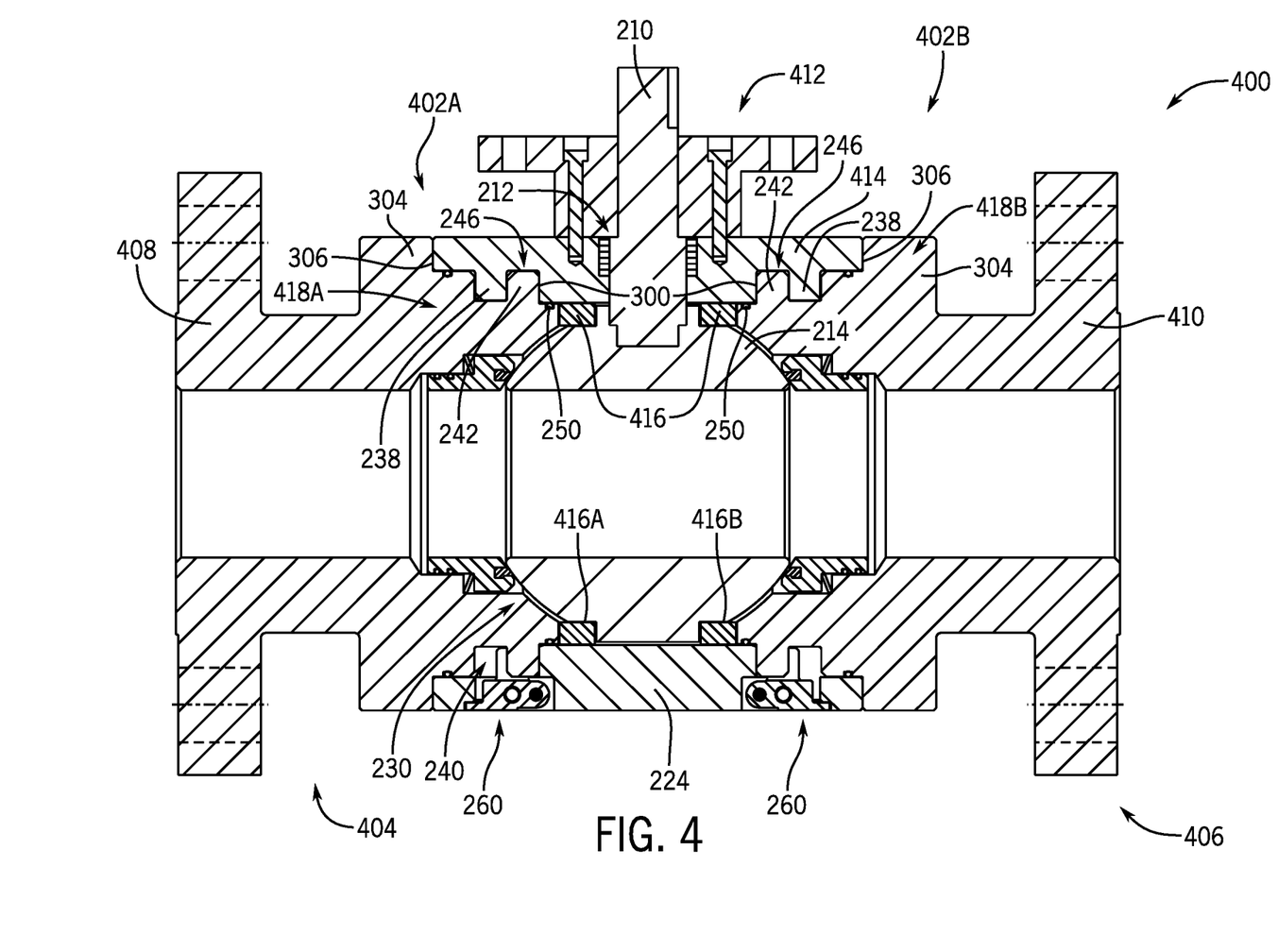
FIG. 4 is a cross-sectional view of an embodiment of a three-part valve, in accordance with embodiments of the present disclosure.

FIG. 4 is a cross-sectional view of an embodiment of a valve 400 that includes a pair of coupling mechanisms 402A, 402B to form a three-part valve, which is illustrated as a ball valve. Each end 404, 406 of the valve 400 includes an individual coupling mechanism 402A, 402B to facilitate coupling a first tail portion 408 at the end 404 and a second tail portion 410 at the end 406. It should be appreciated that various components of the valve 200 and coupling mechanism 202 may be shared with the embodiment of the valve 400, and as a result, certain components and descriptions may not be repeated for clarity.

The illustrated embodiment includes the body 412 which includes a top plate 414 that include the bore 212 for receiving the valve stem 210. The illustrated valve stem 210 couples to the ball body 214, which is arranged within the chamber 230. As illustrated, the valve 400 is not a trunnion valve and may be referred to as a floating ball valve. The bottom plate 224, in combination with the tail portions 408, 410 may be utilized to from a portion of the chamber 230.

In the illustrated embodiment, trunnion blocks 416 are arranged at respective interfaces 418 between portions of the body 412 and the tail portions 408, 410. For example, a first trunnion block 416A is positioned at the interface 418A between the first tail portion 408 and the body 412, while a second trunnion block 416B is positioned at the interface 418B between the second tail portion 410 at the body 412. In various embodiments, the trunnion blocks 416 may be utilized to stabilize the floating ball valve. For example, the trunnion blocks 416 may be plates that have an orifice or hole that vertically aligns with the ball 214 and the stem 210. Furthermore, illustrated in FIG. 4 are the tail portions seals 250, which may be utilized to form a fluid tight seal between the components.

The top plate 414 includes at least a portion of the coupling mechanism 202, such as the illustrated body portion lugs 238 and body portion openings 240. The plate 224 also includes portions of the coupling mechanism 202, however, the body portion lugs 238 are not illustrated in FIG. 4 with respect to the plate 224, and rather, the body portion openings 240 are shown. The tail portion lugs 242 are shown arranged within the body portion groove 246 and contacting the shelf 300. Additionally, the respective outer flanges 304 engage the shoulders 306. Additionally, locking mechanisms 260 are included to engage both of the tail portions 408, 410 to block rotational movement of the tail portions 408, 410 with respect to the body 412.

Figure 5:
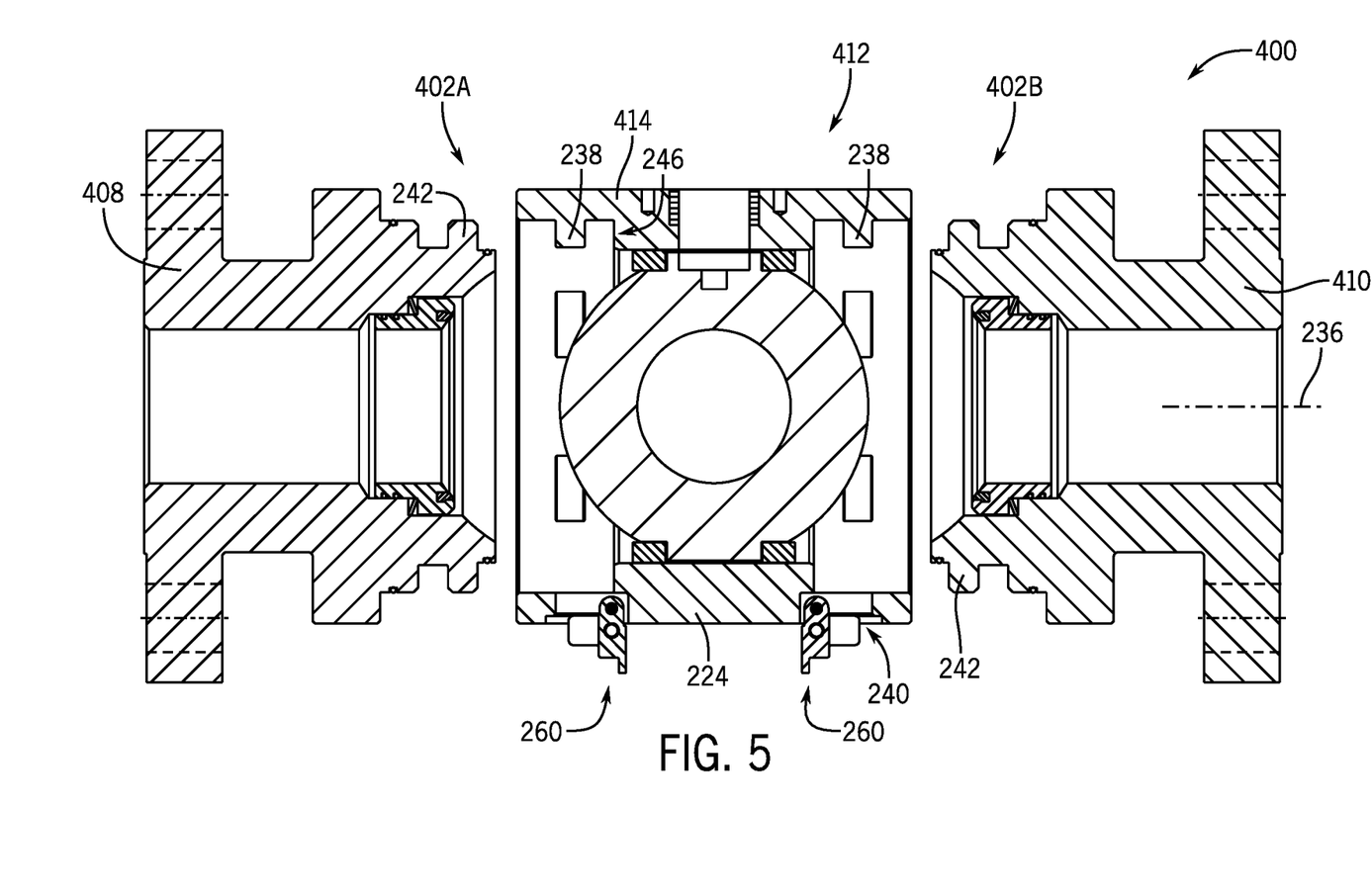
FIG. 5 is a cross-sectional view of an embodiment of a three-part valve, in accordance with embodiments of the present disclosure.

FIG. 5 is cross-sectional view of an embodiment of the valve 400 where the body portion 412 is decoupled from the first tail portion 408 and the second tail portion 410. As described above, in the illustrated embodiment the coupling mechanisms 402A, 402B include components of both the body portion 412 and the tail portions 408, 410. The illustrated top plate 414 includes the body portion lugs 238 and body portion groove 246 while the illustrated plate 224 illustrates the body portion openings 240. In operation, the illustrated tail portion lugs 242 pass through the body portion openings 240 and into the body portion groove 246. The tail portions 408, 410 may then be rotated to align the tail portion lugs 242 and the body portion lugs 238, which blocks axial movement of the tail portions 408, 410 along the flow passage axis 236, with respect to the body portion 412. The locking mechanisms 260 may then be utilized to secure the tail portions 408, 410 into position and blocking rotation of the tail portions 408, 410.

Figure 6A:
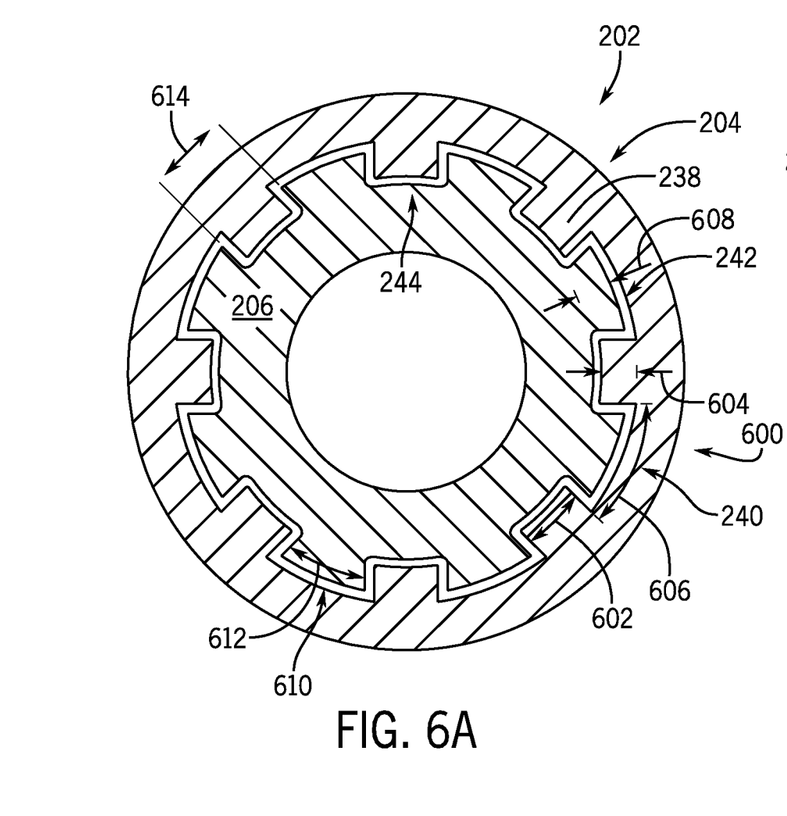
FIG. 6A is a cross-sectional view of an embodiment of a coupling mechanism prior to engagement, in accordance with embodiments of the present disclosure.
Figure 6B:
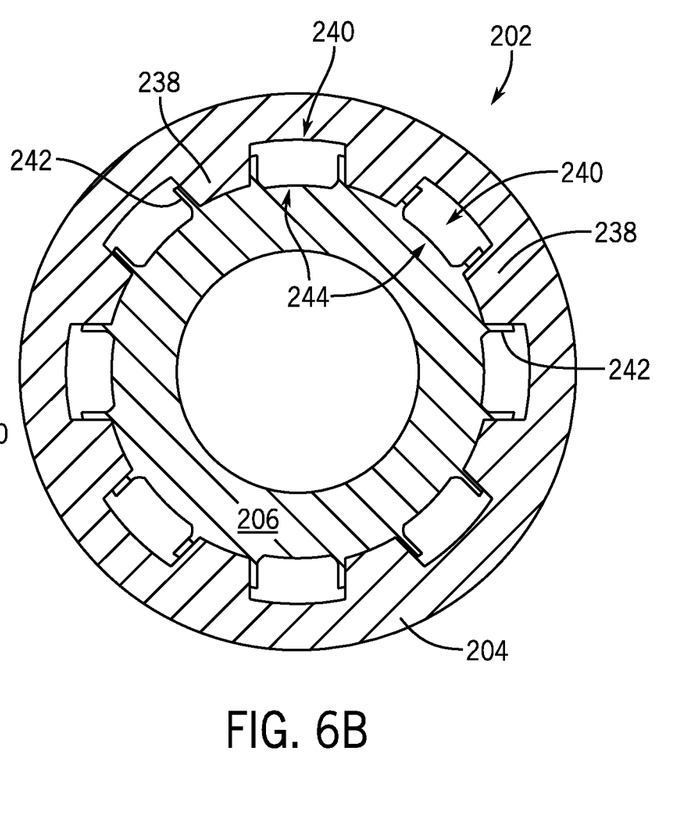
FIG. 6B is a cross-sectional view of an embodiment of a coupling mechanism after engagement, in accordance with embodiments of the present disclosure.

FIGS. 6A and 6B are cross-sectional views of the coupling mechanism 202 joining the body portion 204 to the tail portion 206. In the illustrated embodiment, the body portion 204 is illustrated as being coaxially aligned with the tail portion 206. The body portion 204 is arranged radially outward from the tail portion 206. As described above, in various embodiments, the body portion includes the plurality of body portion lugs 238 arranged circumferentially about an interior circumference 600 of the body portion for a first distance 602. The illustrated body portion lugs 238 extend radially inward toward the flow passage axis 236 a first radial distance 604. As shown, adjacent body portion lugs 238 are positioned as being separated from adjacent lugs by the body portion openings 240, which include a second distance 606.

The illustrated embodiment includes the tail portion 206 having the tail portion lugs 242 extending radially outward a second radial distance 608. The tail portion 206 further includes a plurality of the lugs 242 extending circumferentially about an outer circumference 610 for a third distance 612. As shown, adjacent tail portion lugs 238 are positioned as being separated from adjacent lugs by the tail portion openings 244, which include a fourth distance 614. As described above, the body portion 204 and the tail portion 206 are arranged such that the tail portion lugs 242 may pass through the body portion openings 240 and the body portion lugs 238 may pass through the tail portion openings 244. As a result, axial movement between the tail portion 206 and the body portion 204 is enabled to facilitate coupling of the components.

FIG. 6B illustrates rotational movement of the tail portion 206 such that the tail portion lugs 242 are aligned with the body portion lugs 238, blocking axial movement of the tail portion 206 relative to the body portion 204. In the illustrated embodiment, the respective openings 240, 244 are also aligned. Axial movement of the tail portion 206 relative to the body portion 204 is blocked by an interference between the tail portion lugs 242 and the body portion lugs 238, and further rotation of the tail portion 206 may be blocked via the locking mechanism 260, described above. As a result, the components may be coupled together to resist axial movement without including external fasteners.

Figure 7:
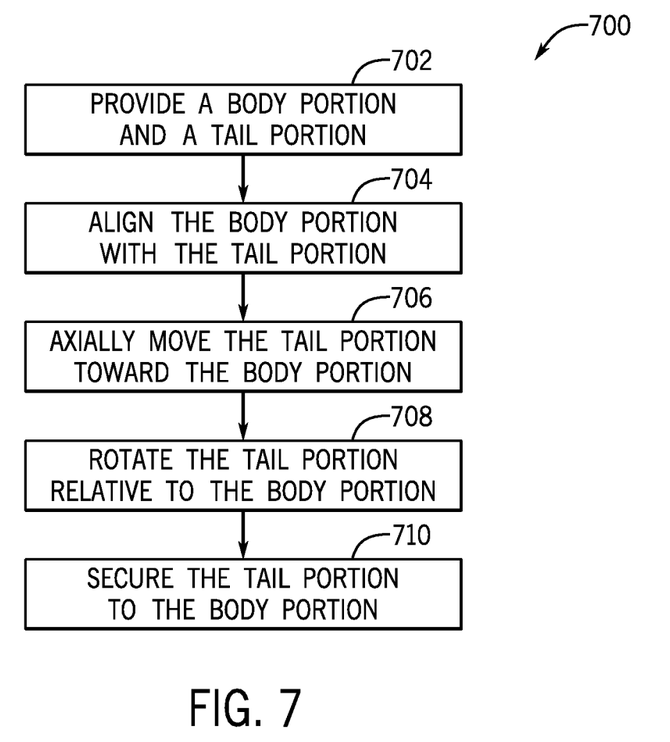
FIG. 7 is a flow chart of an embodiment of a method for using a coupling mechanism, in accordance with embodiments of the present disclosure.

FIG. 7 is a flow chart of an embodiment of a method 700 coupling components of a valve together. It should be appreciated that the steps of the method may be performed in any order, or in parallel, unless otherwise specifically stated. Furthermore, in embodiments, there may be more or fewer steps. The method 700 begins with providing a body portion and a tail portion for forming a valve body closure 702. For example, the body portion may correspond to the body portions of FIG. 2 or 4, and the tail portion may also include a pair of tail portions. In various embodiments, the components may be cast or forged, as well as machined, to facilitate coupling utilizing the coupling mechanism. The tail portion and the body portion are axially aligned 704. For example, alignment may be along a flow passage axis. The tail portion is axially translated toward the body portion 706. It should be appreciate that, in other embodiments, the body portion may be moved toward the tail portion. Axial movement of one of the tail portion of body portion may also translate the tail portion lugs through the body portion openings and into the body portion groove. Thereafter, at least one of the tail portion or the body portion is rotated, relative to the other component 708. For example, the tail portion may be rotated such that the tail portion lugs align with the body portion lugs. Then, the lugs are secured into position 710. For example, a locking mechanism may be activated to block additional rotation of the body portion and/or the tail portion. In this manner, the valve may be quickly assembled and disassembled without utilizing external fasteners.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve for regulating a fluid flow, comprising:
a body portion comprising a first inner surface;
a tail portion comprising a second inner surface; and
wherein the body portion and tail portion are each configured such that the combination of the first inner surface and the second inner surface forms a chamber comprising a substantially spherical segment;
a flow passage intersecting the chamber and comprising a flow passage axis;
a ball body disposed within the chamber and rotatable about a longitudinal axis that is substantially perpendicular to the flow passage axis, and configured such that rotation of the ball body will alternately enable and block flow through the flow passage;
a coupling mechanism joining the body portion to the tail portion, the coupling mechanism comprising:
a plurality of body portion lugs, formed in the body portion, extending radially inward toward a flow passage axis, each body portion lug of the plurality of body portion lugs being separated from an adjacent body portion lug by a body portion opening; and
a plurality of tail portion lugs, formed in the tail portion, extending radially outward from the flow passage axis, each tail portion lug of the plurality of tail portion lugs being separated from an adjacent tail portion lug by a tail portion opening;
wherein each body portion lug is adapted to axially move through a corresponding tail portion opening to transition an axial position of the tail portion relative to the body portion, at least one of the tail portion or the body portion being rotatable relative to the other tail portion or the body portion to axially align at least one body portion lug with at least one tail portion lug to block axial movement of the tail portion relative to the body portion.

2. The valve of claim 1, further comprising:
a body portion groove formed in the body portion; and
a tail portion groove formed in the tail portion;
wherein at least one body portion lug is arranged within the tail portion groove after the tail portion is moved axially with respect to the body portion.

3. The valve of claim 1, further comprising:
a locking mechanism, associated with the coupling mechanism, that blocks rotational movement of the at least one of the tail portion or the body portion when in a locked position and enables rotational moment when in an unlocked position.

4. The valve of claim 1, further comprising:
a second tail portion; and
a second coupling mechanism;
wherein the coupling mechanism is arranged at a first end of the body portion and the second coupling mechanism is arranged at a second end of the body portion, the second tail portion being attached to the body portion at the second end and the tail portion being attached to the body portion at the first end.

5. The valve of claim 1, further comprising:
a tail portion seal arranged between the tail portion and the body portion, the tail portion seal being a first distance from a longitudinal axis of the valve, and a tail portion lug of the plurality of tail portion lugs being a second distance from the longitudinal axis, wherein the first distance is less than the second distance.

6. The valve of claim 1, further comprising a body valve seat positioned in a flow passage of the body portion.

7. The valve of claim 1, further comprising:
a body valve seat positioned in a flow passage of the body portion; and
a tail valve seat positioned in a flow passage of the tail portion;
wherein at least one of the body valve seat and the tail valve seat is removable.

8. The valve of claim 1, further comprising
a tail valve seat positioned in a flow passage of the tail portion.

9. The valve of claim 1, further comprising:
an outer flange of the tail portion, the outer flanged positioned radially outward from the plurality of tail portion lugs; and
a shelf of the body portion, the shelf positioned radially outward from the plurality of body portion lugs;
wherein the outer flange contacts the shelf when the plurality of tail portion lugs are axially moved relative to the body portion, the contact being indicative of a coupled condition for the valve.

10. A valve for regulating a fluid flow, comprising:
a body portion comprising:
a first inner surface;
a plurality of body portion lugs, each body portion lug of the plurality of body portion lugs being separated from an adjacent body portion lug by a body portion opening, and
a body portion groove, the body portion groove arranged proximate the plurality of body portion lugs;
a tail portion comprising:
a second inner surface;
a plurality of tail portion lugs, each tail portion lug of the plurality of tail portion lugs being separated from an adjacent tail portion lug by a tail portion opening, and
a tail portion groove, the tail portion groove arranged proximate the plurality of tail portion lugs;
a chamber comprising a substantially spherical segment formed by the combination of the first inner surface and the second inner surface; and
a ball body positioned within the chamber, the ball body being rotatable about a longitudinal axis to alternately enable and block flow through a flow passage arranged along a flow passage axis, the flow passage axis being substantially perpendicular to the longitudinal axis;

wherein the tail portion is adapted to move axially relative to the body portion, along the flow passage axis, to transition the plurality of tail portion lugs from a first side of the body portion lugs to a second side of the body portion lugs, at least one of the tail portion or the body portion being rotatable relative to the other tail portion or the body portion to axially align at least one body portion lug with at least one tail portion lug to block axial movement of the tail portion relative to the body portion.

11. The valve of claim 10, wherein at least one tail portion lug is arranged within the body portion groove after the tail portion is moved axially with respect to the body portion.

12. The valve of claim 10, further comprising:
a locking mechanism, arranged within an opening in at least one of the body portion or the tail portion, that blocks rotational movement of the at least one of the tail portion or the body portion when in a locked position and enables rotational moment when in an unlocked position.

13. The valve of claim 10, further comprising:
a second tail portion, the second tail portion comprising:
  a plurality of second tail portion lugs, each second tail portion lug of the plurality of second tail portion lugs being separated from an adjacent second tail portion lug by a second tail portion opening, and
  a second tail portion groove, the second tail portion groove arranged proximate the plurality of second tail portion lugs; and
wherein the second tail portion is attached to a second end of the body portion, opposite a first end, and the tail portion is attached to the body portion at the first end.

14. The valve of claim 10, further comprising:
a tail portion seal arranged between the tail portion and the body portion, the tail portion seal being a first distance from a longitudinal axis of the valve, and a tail portion lug of the plurality of tail portion lugs being a second distance from the longitudinal axis, wherein the first distance is less than the second distance.

15. The valve of claim 10, wherein the valve is at least one of a trunnion ball valve or a floating ball valve.

16. The valve of claim 10, wherein coupling ends of the valve include at least one of a flanged end, a threaded end, a slip end, or a weld prepped end.

17. A method for forming a valve body closure, comprising:
positioning a body portion, comprising a first inner surface and a plurality of body portion lugs separated by openings, proximate a tail portion, comprising a second inner surface and a plurality of tail portion lugs separated by openings, the body portion and the tail portion being axially aligned and configured such that the combination of the first inner surface and the second inner surface forms a chamber comprising a substantially spherical segment;
moving at least one of the body portion or the tail portion axially toward the other of at least one of the body portion or the tail portion such that at least part of the body portion overlaps at least part of the tail portion; and
rotating at least one of the body portion or the tail portion with respect to the other at least one of the body portion or the tail portion.

18. The method of claim 17, further comprising:
blocking rotation of the body portion with respect to the tail portion via a locking mechanism.

19. The method of claim 17, further comprising:
aligning a plurality of body portion lugs with a plurality of tail portion openings.

20. The method of claim 17, wherein rotating at least one of the body portion or the tail portion with respect to the other at least one of the body portion or the tail portion, further comprises:
aligning a plurality of body portion lugs with a plurality of tail portion lugs to block axial movement of the tail portion with respect to the body portion.

* * * * *